May 18, 1948.  C. L. GREGG  2,441,627
VEHICLE WHEEL CHOCK
Filed May 3, 1946  2 Sheets-Sheet 1

INVENTOR
C. L. Gregg
BY
Robb & Robb
ATTORNEYS.

May 18, 1948. C. L. GREGG 2,441,627
VEHICLE WHEEL CHOCK
Filed May 3, 1946 2 Sheets-Sheet 2

INVENTOR
C. L. Gregg
BY
Robb & Robb
ATTORNEYS.

Patented May 18, 1948

2,441,627

UNITED STATES PATENT OFFICE 2,441,627

VEHICLE WHEEL CHOCK

Charles L. Gregg, Chittenango, N. Y.

Application May 3, 1946, Serial No. 667,132

2 Claims. (Cl. 188—32)

The present invention appertains to vehicle wheel chocks, and more particularly, to a new and improved chock device for use with automobiles or other vehicle wheels as an adjunct to the vehicle jack.

It has been found that in jacking up many automobiles of present day design, the elevation to which the corner of the automobile has to be raised to permit the changing of a tire or wheel, is considerable and far in excess of the elevation formerly necessary, which is largely due to the more modern elongated spring suspension and the greater fender depth tending to cover the wheel, as typical of current automobile designs. This is particularly true when employing bumper jacks which have come into rather extensive use in recent years.

When the vehicle is jacked up at one corner, there is considerable danger of causing the automobile to side-slip, usually in a direction toward the side opposite to that side at which the jack is located. Such side-slipping is particularly likely when the wheel at the side opposite to the jack is resting on a relatively smooth or hard surface, such as a pavement, or where the surface is wet or greasy, or has loose sand or other gritty particles on the same. Irrespective of the condition of the roadway or other supporting surface, the area of contact between the surface and the bottom of the tire when resting thereon is quite limited and confined to only a few square inches, at most, and it is very easy to inadvertently exceed the critical friction limit serving to prevent side-slip, when the vehicle is jacked up, thereby creating a serious and dangerous hazard, both to the vehicle itself and to the person manipulating the jack or changing the tire, not to mention the loss of time and the aggravation resulting from the necessity of jacking up the vehicle again, even if no damage to the vehicle or to the person has occurred when the vehicle side-slips off the jack and drops the wheel down.

The primary object of this invention is to provide a simple, inexpensive and effective chocking device which will prevent side-slipping when the vehicle is jacked up, especially when bumper jacks are used.

A further object of the invention is to provide a vehicle wheel chock of the general type above referred to, onto which one wheel of the vehicle can be driven without tending to displace the chock from under the wheel, and which serves to automatically center the wheel thereon as the wheel rides onto the same, and thereafter serves to prevent side-slip in at least one direction, while at the same time preventing forward or rearward motion of the vehicle.

A still further object of the invention is to provide a vehicle wheel chock onto which one wheel of the vehicle can be readily driven preliminary to the jacking-up of the wheel at the opposite side of the vehicle, said chock having abutment means to engage the wheel thereon at least at one side thereof, also at the back and at the front of the wheel, and the chock presenting a relatively flat surface of substantial area on its lower face to engage the ground with sufficient frictional resistance to prevent side-slipping of the vehicle when elevated at the opposite side to the usual extent required for tire or wheel changing purposes.

Other and further objects and advantages of the invention will be hereinafter described and the novel features thereof defined in the appended claims.

Figure 1:
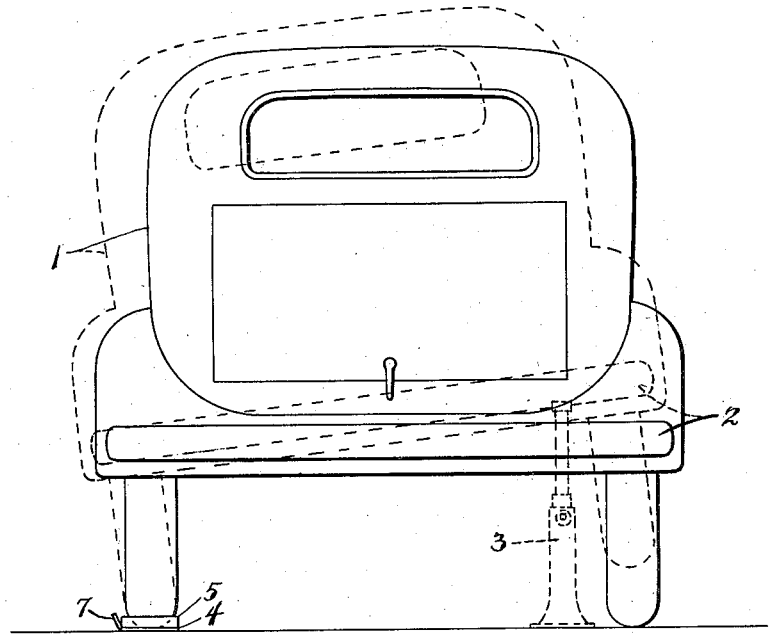
Figure 1 is a view in rear elevation of a conventional automobile, beneath one wheel of which my improved chock is located when in use in jacking up the opposite wheel, with the jack shown in dotted lines and the vehicle also shown in dotted lines in the jacked-up position, and in full lines in the lowered position.

Like reference characters designate corresponding parts in the several figures of the drawings, wherein I generally denotes an automobile or other conventional vehicle, and 2 the bumper of such vehicle. 3 represents a bumper jack which may be of any conventional construction and which is used to jack up the vehicle when it is desired to change a wheel or tire. In Figure 1 of the drawings, the vehicle is shown in full lines with the wheels resting on the ground, and also shown in broken lines with one corner of the vehicle jacked up to the elevation desired in changing a wheel or tire.

The present invention more particularly concerns a new and improved wheel chock, as shown generally at 4, the details of which may be best understood from reference to Figures 3 to 6 inclusive of the drawings.

Figure 2:
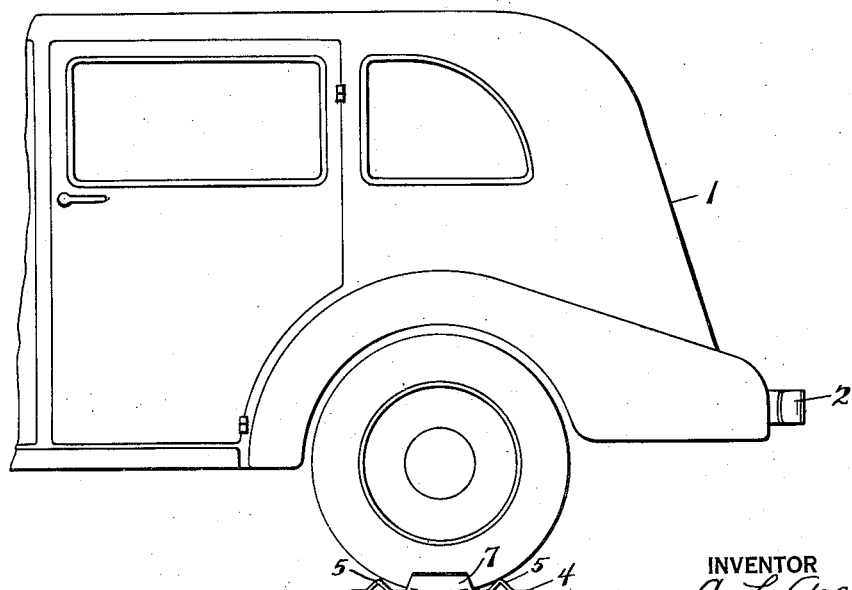
Figure 2 is a fragmentary view of the vehicle in side elevation, with the wheel chock in position beneath one wheel.
Figure 3:
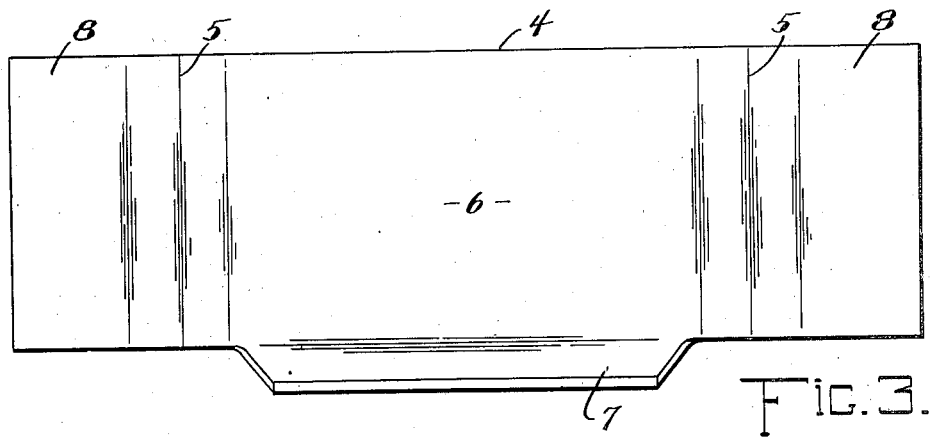
Figure 3 is a top plan view of the wheel chock per se on an enlarged scale.
Figure 4:
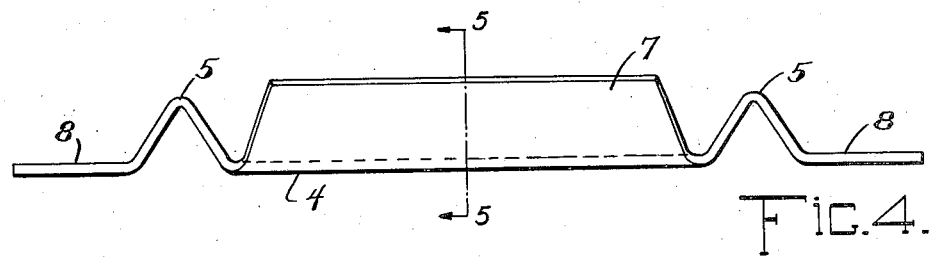
Figure 4 is a view of the wheel chock in side elevation, as seen towards the flanged side thereof.
Figure 5:
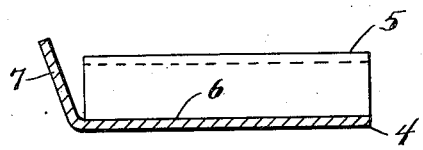
Figure 5 is a transverse sectional view taken on the line 5—5 of Figure 4.
Figure 6:
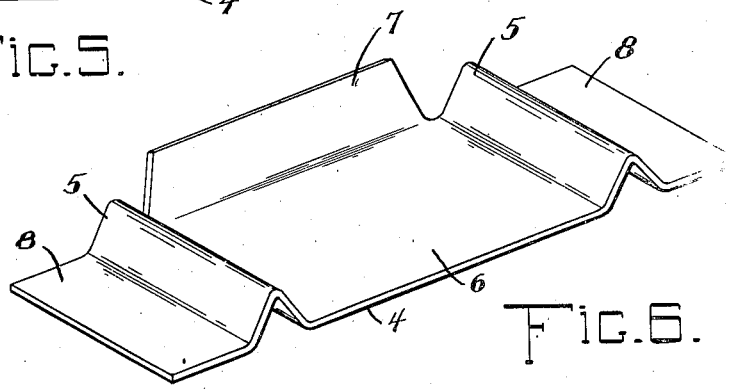
Figure 6 is a perspective view of the wheel chock.

It will be seen that the chock device 4 consists of a generally rectangular plate which is preferably made of plate steel of sufficient thickness to impart rigidity to the plate. Adjacent to each end of the plate, the plate is upwardly offset to form a pair of transversely extended wheel abutments 5, 5 arranged in longitudinally spaced relation to each other, and of inverted V-shape in cross section. These abutments may be formed in any suitable manner, as by means of a press which may be used to depress or deform the plate at the points where the abutments are to be provided. The height of the abutments 5, 5 may be varied as desired, but for practical purposes, the abutments should be only of sufficient height to enable the vehicle wheel to readily run over the same longitudinally of the plate, without damaging the tire, while at the same time, causing the vehicle wheel to be self-centered on the plate between the two abutments, with the wheel lying in the space between the abutments and resting upon the central flat portion 6 of the plate, as shown in Figure 2 of the drawings.

As also clearly shown in the drawings, the plate is provided along one longitudinal edge with a marginal flange projecting upwardly therefrom and located between the abutments 5, 5, said flange being designated 7. The flange 7 is preferably laterally inclined upwardly and outwardly so as to aid in centering the wheel laterally on the plate, in case the wheel is driven onto the plate close to the flanged edge of the same. While only one flange 7 is shown in the drawings, it will be obvious that a corresponding flange may be provided along the opposite marginal edge of the plate, if desired, the flanges preferably being formed as an integral part of the plate, in one piece, or made separately and then welded to the edge of the plate, if preferred.

The purpose of the flange 7 is to prevent sideslip of the vehicle in at least one direction. Thus when the wheel chock is to be used, the chock is placed on the ground in front of the wheel at that side of the vehicle opposite to the side which is to be jacked-up, with the flange 7 arranged towards the outboard side of the wheel which is to be driven onto the plate. As the wheel rides onto the plate, it first passes onto the flat extremity 8 at one end of the plate, imposing the weight of the vehicle on such end of the plate and holding it firm, without tilting or canting the plate or tending to displace it from beneath the wheel as the wheel continues to ride over the adjacent abutment 5. The flat portion at the end of the plate, just referred to, is duplicated at the opposite end as also indicated at 8. In other words, both wheel abutments 5, 5 are spaced inwardly from the respective extreme ends of the plate for a substantial distance.

It will be understood from the foregoing that the plate is of such size as to present on its lower face a flat surface of substantial area which is adapted to contact the ground. This, when the vehicle wheel is resting on the chock in the position shown in Figure 2 of the drawings, with the opposite corner of the car jacked-up, the wheel on the chock is prevented from side-slipping by the flange 7 on the chock, while the chock itself will not tend to slip relative to the ground because of the substantial area of contact between the chock plate and the ground, which offers considerably more frictional resistance than the limited area of a tire when resting on the ground. Thus, my new wheel chock is exceedingly simple in construction and inexpensive in cost, yet fully effective to prevent side-slipping of the vehicle, especially when used with bumper jacks.

While the specific details have been herein shown and described, my invention is not confined thereto as changes and alterations may be made without departing from the spirit thereof as defined by the appended claims.

I claim:

1. A vehicle wheel chock of the class described, comprising a rigid plate having a pair of transversely extended wheel abutments projecting upwardly therefrom in longitudinally spaced relation to each other, and having a flange projecting upwardly from at least one longitudinal edge of the plate and extending along said edge from a point adjacent to one abutment to a point adjacent to the other abutment aforesaid, said transversely extended wheel abutments being pressed upwardly from the body of the plate and being of inverted V-shape in cross-section.

2. A vehicle wheel chock of the class described, comprising a rigid plate having a pair of transversely extended wheel abutments projecting upwardly therefrom in longitudinally spaced relation to each other, and having a flange projecting upwardly from at least one longitudinal edge of the plate and extending along said edge from a point adjacent to one abutment to a point adjacent to the other abutment aforesaid, said wheel abutments and flange being constructed as an integral part of the plate, in one piece.

CHARLES L. GREGG.

REFERENCES CITED

The following references are of record in the file of this patent:

UNITED STATES PATENTS

| Number | Name | Date |
| --- | --- | --- |
| 2,117,026 | Kennedy | May 10, 1938 |

FOREIGN PATENTS

| Number | Country | Date |
| --- | --- | --- |
| 418,144 | Germany | Sept. 1, 1925 |